United States Patent [19]

Yamamoto et al.

[11] Patent Number: 4,768,487
[45] Date of Patent: Sep. 6, 1988

[54] INTERNAL COMBUSTION ENGINE INTAKE PASSAGE

[75] Inventors: Yasuji Yamamoto, Hikoke; Haruo Yuzawa; Teruyoshi Nishihara, both of Yokohama, all of Japan

[73] Assignee: Nissan Motor Company, Limited, Japan

[21] Appl. No.: 929,877

[22] Filed: Nov. 13, 1986

[30] Foreign Application Priority Data

Nov. 22, 1985 [JP] Japan .......................... 60-180429[U]

[51] Int. Cl.⁴ ........................ F02D 9/02; F02M 55/02
[52] U.S. Cl. ................................... 123/470; 123/432; 123/468
[58] Field of Search ......... 123/52 M, 52 MV, 188 M, 123/308, 432, 457, 468, 469, 470, 471, 472

[56] References Cited

U.S. PATENT DOCUMENTS

| 4,111,163 | 9/1978 | Edever et al. .................... 123/52 M |
| 4,243,000 | 1/1981 | Yamada ............................... 123/432 |
| 4,381,749 | 5/1983 | Sugiyama ........................... 123/432 |
| 4,458,555 | 7/1984 | Holtzberg et al. ........... 123/197 AB |
| 4,474,159 | 10/1984 | Katnik ................................. 123/468 |
| 4,563,984 | 1/1984 | Ziegler et al. .................... 123/52 M |

FOREIGN PATENT DOCUMENTS

| 3511382 | 10/1985 | Fed. Rep. of Germany ...... 123/432 |
| 57-102518 | 6/1982 | Japan . |
| 59-192825 | 11/1984 | Japan . |
| 0043163 | 3/1985 | Japan ................................. 123/457 |

Primary Examiner—Tony M. Argenbright
Assistant Examiner—Eric R. Carlberg
Attorney, Agent, or Firm—Pennie & Edmonds

[57] ABSTRACT

A spacer, which is interposed between a cylinder head and an intake manifold in order to facilitate installation of a swirl control valve or valves, is made of thermosetting phenol or epoxy resin so as to prevent the transfer of heat from the cylinder head to the intake manifold. The spacer installs thereon a fuel injector or injectors and may be provided with a fuel supply passage, pressure regulator, fuel damper, etc. as an integral unit.

7 Claims, 5 Drawing Sheets

INTERNAL COMBUSTION ENGINE INTAKE PASSAGE

BACKGROUND OF THE INVENTION

1. Field of the Invention

The present invention relates in general to internal combustion engines and more particularly to an intake passage of a gasoline internal combustion engine.

2. Description of the Prior Art

Various methods and techniques have been proposed in the art for variably controlling the flow or swirl of the air-fuel mixture within the combustion chamber depending upon the engine operating conditions with a view to improving the fuel consumption.

FIGS. 9 and 10 show an intake device having two intake valves 1, 2 and two intake ports 3, 4 for each engine cylinder. The intake ports 3, 4 are communicated with a collector portion of an intake manifold 5 through first and second independent branch passages 6, 7, respectively. In the second branch passage 7 there is disposed a swirl control valve 9 which is adapted to close, being actuated by an actuator 8, in response to a low-load engine operating condition.

Under a low-load engine operating condition in which the swirl control valve 9 is held closed, air-fuel mixture flows into the combustion chamber only through the first branch passage 6, thus permitting the supply of air-fuel mixture into the combustion chamber to become partial and at the same time the mixture to flow at an increased speed thereby producing a strong swirl within the combustion chamber. The combustion speed is thus increased, improving the thermal efficiency and therefore the engine performances such as the fuel consumption, etc.

Under a high-load engine operating condition in which the swirl control valve 9 is held open, air-fuel mixture is supplied into the combustion chamber through the both first and second branch passages 6, 7, thus not applying any substantial resistance to the flow of the incoming mixture and therefore increasing the charging efficiency to achieve a desired engine output. In the meantime, indicated by the reference numerals 10, 11 are two exhaust valves for each cylinder.

In this kind of intake device, with a view to accomplishing easy installation of the swirl control valve 9, a valve body or spacer 14 is utilized which is formed with two intake bores 12, 13 for each engine cylinder. The spacer 14 has disposed in one 13 of the intake bores the swirl control valve 9 and is interposed between the intake manifold 5 and the cylinder head 16 in such a manner that the intake bores 12, 13 are respectively connected to the branch passages 6, 7 and the intake ports 3, 4 to establish communication therebetween. The spacer 14 is secured at its flanges 15 to the intake manifold 5 and a cylinder head 16.

In such an intake device, the spacer 14 is made of metal so that it can be produced by an aluminum die casting or the like. For this reason, the heat of the engine coolant is efficiently transmitted to the intake manifold 5, resulting in a high temperature of the intake manifold 5 and a lowered charging efficiency.

Further, such a high temperature intake manifold 5 causes the temperature of a carburetor or fuel injector to rise just after the engine is stopped, resulting in a possibility of percolation in the fuel supply line, leading to a difficulty in re-starting of the engine.

SUMMARY OF THE INVENTION

In accordance with the present invention, there is provided a novel and improved air intake device for an internal combustion engine. The intake device comprises a cylinder head having an intake port, an intake manifold having an intake passage and a spacer formed with an intake bore and interposed between the cylinder head and the intake manifold in such a manner that the intake port and the intake passage are communicated with each other through the intake bore.

The foregoing may substantially follow the conventional fashion. In accordance with the present invention, the spacer is made of a thermosetting resinous material. In one embodiment, the thermosetting resinous material comprises a thermosetting phenol resin or thermosetting epoxy resin. In another embodiment, the spacer installs thereon a fuel injector and furthermore may be provided with a fuel supply passage, pressure regulator, fuel damper, etc. as an integral unit.

The above structure is quite effective for overcoming the above noted disadvantages and shortcomings.

It is accordingly an object of the present invention to provide a novel and improved air intake device for an internal combustion engine which can assuredly prevent percolation in a fuel supply line thereby making it possible to re-start the engine without any difficulty.

It is another object of the present invention to provide a novel and improved air intake device of the above described character which can improve the assembling efficiency as well as the charging efficiency.

It is a further object of the present invention to provide a novel and improved air intake device of the above described character which can improve the engine performances such as the fuel consumption, etc.

It is a further object of the present invention to provide a novel and improved air intake device of the above described character of which design restrictions are reduced.

DETAILED DESCRIPTION OF THE PREFERRED EMBODIMENTS

Figure 1:
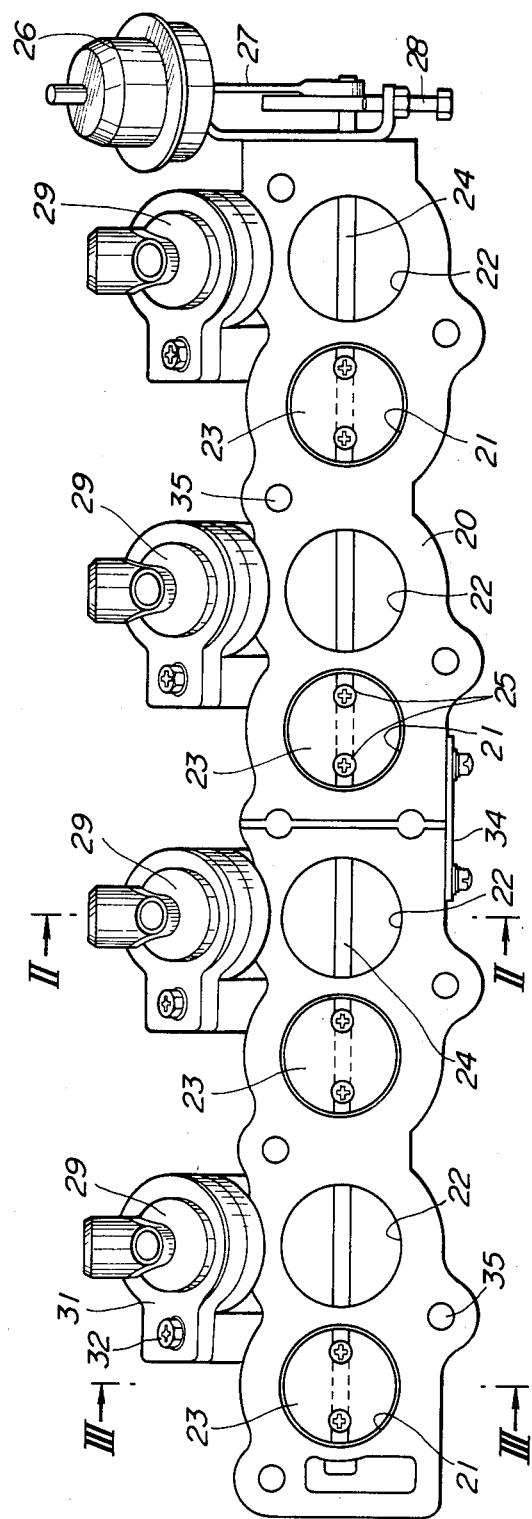
FIG. 1 is an elevational view of a spacer and its associated parts employed in an intake device according to an embodiment of the present invention.
Figure 2:
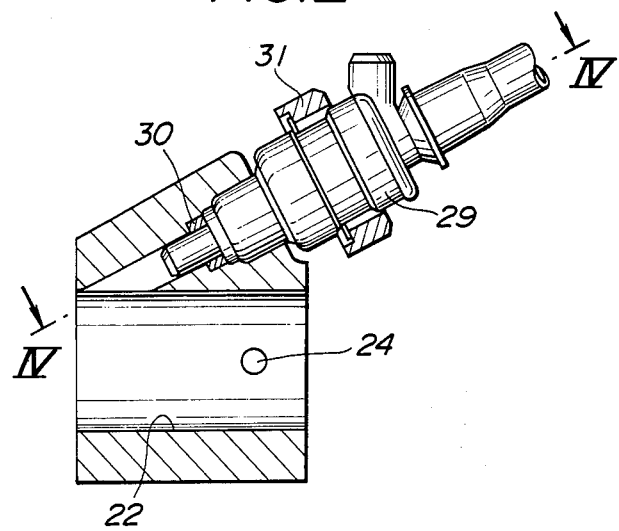
FIGS. 2 to 4 are sectional views taken along the lines II—II, III—III, IV—IV of FIG. 1, respectively.
Figure 3:
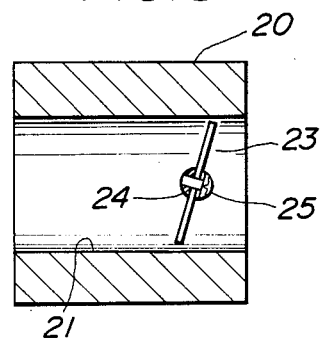
Figure 4:
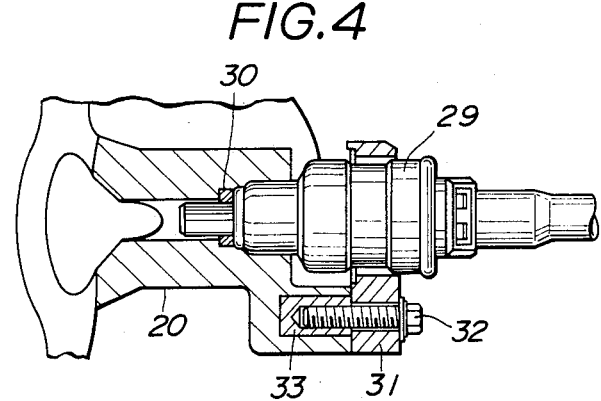
Figure 5:
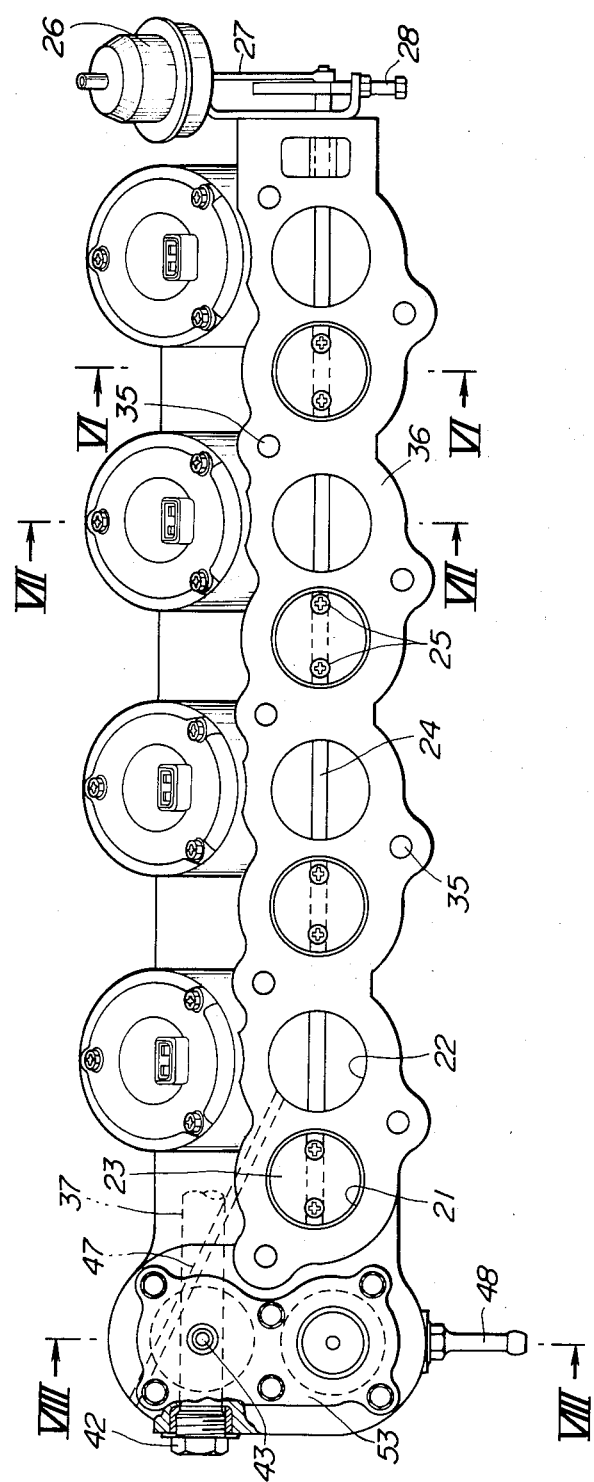
FIG. 5 is a view similar to FIG. 1 but showing another embodiment of the present invention.
Figure 6:
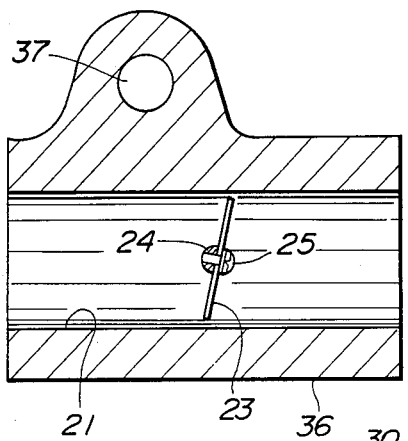
FIGS. 6 to 8 are sectional views taken along the lines VI—VI, VII—VII, VIII—VIII of FIG. 5, respectively.
Figure 7:
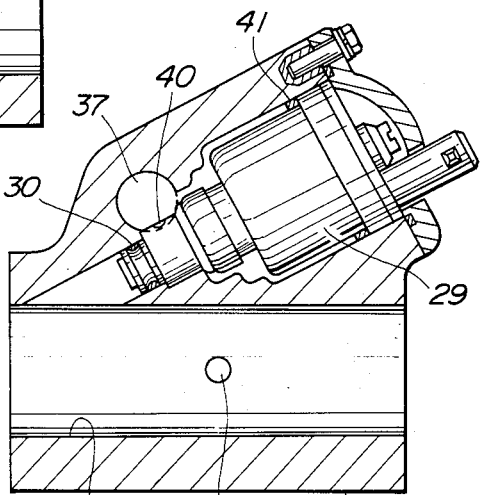
Figure 8:
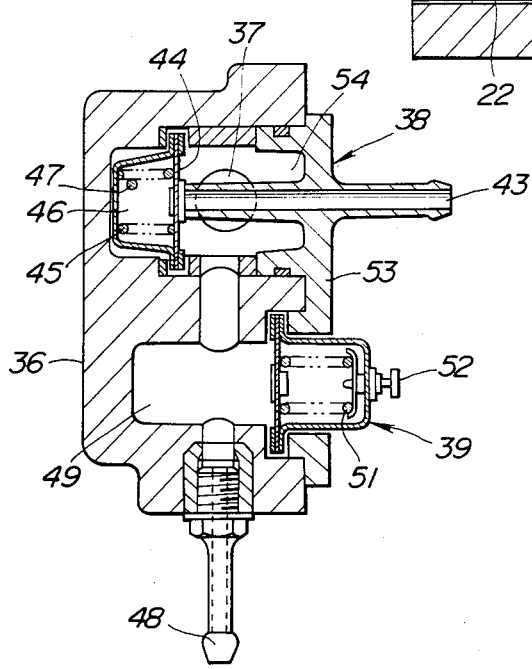

Referring first to FIGS. 1 through 4, indicated by the reference numeral 20 is a spacer consisting of two centerally separated sections.

Figure 9:
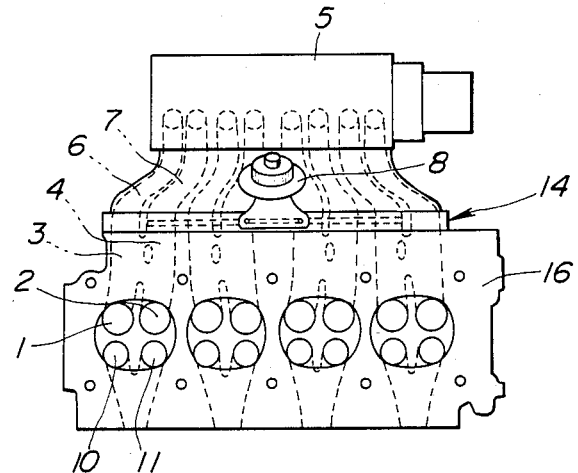
FIG. 9 is a bottom plan view of a prior art intake device.
Figure 10:
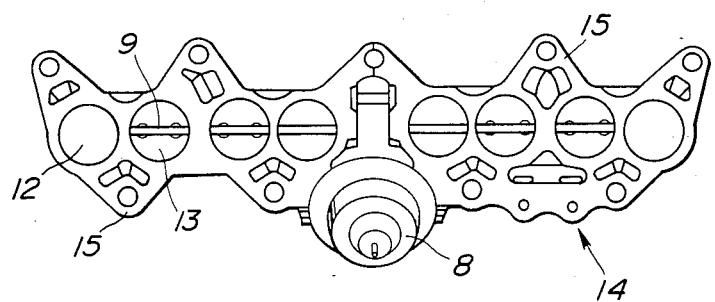
FIG. 10 is an elevational view of a spacer and its associated parts employed in the intake device of FIG. 9.

The spacer 20 is made of thermosetting phenol or epoxy resin and interposed between the intake manifold 5 and the cylinder head 16 of FIG. 9 in place of the spacer 14.

The spacer 20 is formed with a pair of first and second intake bores 21, 22 for each engine cylinder. The intake bores 21, 22 are respectively connected with the branch passages 6, 7 of the intake manifold 5 and also with the intake ports 3, 4 of the cylinder head 16 to establish communication therebetween. Since this embodiment is adapted, by way of example, for use in a four-cylinder engine, the spacer 20 is formed with four pairs of such first and second intake bores 21, 22. A butterfly type swirl control valve 23 is movably disposed in each first intake bore 21 and adapted to define an annular space between the peripheral edge thereof and the inner wall of the first intake bore 21 even when it is put into its fully closed position.

The swirl control valve 23 is secured with bolts 25 to a control shaft 24 to rotate therewith. The control shaft 24 extends diametrically of the first and second intake bores 21, 22 and penetrates through the same to have an end projecting from a longitudinal end of the spacer 20. The control shaft 24 is connected at the projected end to a control rod 27 which is in turn connected to a diaphragm unit 26 so as to be actuated thereby in a conventional manner. Indicated by the reference numeral 28 is a stopper for adjustably limiting the rotatable extent of the control shaft 24 and therefore the swirl control valve 23.

A fuel injector 29 for each engine cylinder is installed on the spacer 20 in such a manner that its injection port is directed toward the second intake bore 22. A sealing member 30 is interposed between the spacer 20 and the fuel injector 29 to provide a seal therebetween. In this connection, the fuel injector 29 is secured by means of a support plate 31 and a bolt 32 to the spacer 20. The bolt 32 is screwed into a nut 33 which is embedded in the spacer 20 and fixed thereto prior to installation of the fuel injector 29.

Indicated by the reference numeral 34 is a metal connector interconnecting the separated sections of the spacer 20 into a single unit and by 35 a bolt accommodation hole used for fastening the spacer 20 to the intake manifold 5 and the cylinder head 16 (refer to FIG. 9).

With the foregoing structure, the transfer of heat from the cylinder head 16 to the intake manifold 5 is efficiently prevented or reduced since the spacer 20 is now made of a thermosetting resinous material and can serve as a heat insulator.

It is therefore to be understood that the intake manifold is assuredly prevented from being heated up to a high temperature, thus making it possible to maintain the temperature of the intake air-fuel mixture lower than a desired value and retain a high charging efficiency assuredly.

It is further to be understood that since the fuel injector 29 is installed on the spacer 20 and assuredly prevented from being heated up to a high temperature, its reliability in operation can be improved.

It is still further to be understood that since the temperature of the intake manifold 5 and the spacer 20 is maintained lower than heretofore, the transfer of heat therefrom to the fuel supply line including the fuel injector 29 is reduced, thus making it possible to assuredly prevent percolation in the fuel supply line. Thus, it becomes possible to re-start the engine without any difficulty.

FIGS. 5 to 8 show another embodiment of the present invention. In this embodiment, a single piece spacer 36 is utlized to install thereon a fuel injector 29 for each engine cylinder and is formed with a fuel supply passage 37 for supply of fuel to the fuel injector 29. The spacer 36 has a built-in fuel regulator 38 and fuel damper 39, i.e., the fuel regulator 38 and fuel damper 39 are provided to the spacer 36 as an integral unit.

The fuel supply passage 37 is arranged to extend longitudinally of the spacer 36 and adjacent the fuel injection port of the fuel injector 29. The fuel injector 29 is formed with a fuel induction port 40 in communication with the fuel supply passage 37 for introducing fuel therefrom into the fuel injection port. Indicated by the reference numeral 41 is a sealing member and by 42 a closure bolt sealingly closing an end of the fuel supply passage 37.

The pressure regulator 38 controls the pressure of fuel to be supplied to the fuel supply passage 37 in such a manner that the difference in pressure between the fuel supply passage 37 and the second intake port 22 is held substantially constant. To this end, the pressure regulator 38 consists of a fuel chamber 54 in communication with the fuel supply passage 37, a fuel inlet 48 in communication with the fuel chamber 54 for supply of fuel under pressure thereto, a fuel outlet 43 communicable with the fuel chamber 54 for discharge of fuel therefrom, a diaphragm 44 movable to selectively establish and obstruct communication between the fuel outlet 43 and the fuel chamber 54 and a spring 45 for urging the diaphragm 44 in the direction to close the fuel outlet 43. The pressure regulator 48 further includes a vacuum chamber 46 which is partly defined by the diaphram 44 and communicated with the intake bore 22 through a vacuum passage 47 formed in the spacer 36.

The fuel damper 36 is adapted to prevent pulsation of the incoming fuel from the fuel inlet 48. To this end, the fuel damper 36 consists of a fuel chamber 49 placed between the fuel inlet 48 and the fuel chamber 54, a diaphram 50 defining part of the fuel chamber 49 and movable to vary the volume of the fuel chamber 49, a spring 51 urging the diaphram 50 in the direction to reduce the volume of the fuel chamber 49 and an adjusting mechanism 52 for adjustment of the biasing force exerted by the spring 51. The fuel damper 39 is installed in the above manner together with the pressure regulator 38 in the same longitudinal end of the spacer 36. Indicated by the reference numeral 53 is a cover plate.

With the above structure, it is to be understood that the fuel supply passage 37, pressure regulator 38 and fuel damper 39 are all surrounded by a mass of a thermosetting resinous material constituting the spacer 36 and therefore free from the influence of heat from the engine and the circumferential air, thus making it possible to prevent percolation in the fuel supply line and achieve stable fuel supply more assuredly.

It is further to be understood that since the above parts to be built in the spacer 36 are adapted to form an integral unit, the intake device can be assembled with an improved efficiency.

It is still further to be understood that since the arrangement of such parts can be determined without considering the influence of heat, the design restrictions of the air intake device can be reduced.

It is yet further to be understood that some heat insulators otherwise necessitated can be dispensed with.

What is claimed is:

1. An air intake device for an internal combustion engine comprising:
   a cylinder head having an intake port;
   an intake manifold having an intake passage; and
   a spacer formed with an intake bore and interposed between said cylinder head and said intake manifold in such a manner that said intake port and said intake passage are communicated with each other through said intake bore, said spacer being formed with a thermosetting resinous material.

2. An air intake device for an internal combustion engine, comprising:
a cylinder head having two intake ports for each engine cylinder;
an intake manifold having two independent branch passages for each engine cylinder;
a spacer formed with two intake bores and interposed between said cylinder head and said intake manifold in such a manner that said intake ports are communicated with said branch passages through said intake bores, respectively, said spacer being formed with a thermosetting resinous material; and
a swirl control valve disposed in one of said intake bores.

3. An air intake device as set forth in claim 2, further comprising a fuel injector for each engine cylinder and installed on said spacer in such a manner that its injection port is directed toward the other of said intake bores.

4. An air intake device as set forth in claim 3, further comprising fuel supply passage means formed in said spacer for supply of fuel to said fuel injector, fuel regulator means installed on said spacer for controlling the pressure of fuel to be supplied to said fuel supply passage means in such a manner that the difference in pressure between said fuel supply passage means and said other intake bore is held substantially constant, and fuel damper means installed on said spacer for preventing pulsation of fuel to be supplied to said fuel supply passage means.

5. An air intake device as set forth in claim 4 wherein said fuel regulator means and said fuel damper means are installed on the same longitudinal end of said spacer.

6. An air intake device as set forth in claim 1 wherein said thermosetting resinous material comprises thermosetting phenol resin.

7. An air intake device as set forth in claim 1 wherein said thermosetting resinous material comprises thermosetting epoxy resin.

* * * * *

UNITED STATES PATENT AND TRADEMARK OFFICE
CERTIFICATE OF CORRECTION

PATENT NO. : 4,768,487
DATED : September 6, 1988
INVENTOR(S) : Yamamoto, Yasuji; Yuzawa, Haruo; Nishihara, Teruyoshi It is certified that error appears in the above-identified patent and that said Letters Patent is hereby corrected as shown below:

Title page, Item [73] should read as follows:

-- ASSIGNEE: NISSAN MOTOR COMPANY, LIMITED
Tokyo, Japan and

SHIN-KOBE ELECTRIC MACHINERY COMPANY, LIMITED
Tokyo, Japan --.

Signed and Sealed this

Seventh Day of February, 1989

Attest:

DONALD J. QUIGG

*Attesting Officer*     *Commissioner of Patents and Trademarks*